United States Patent [19]

Hunsbedt et al.

[11] Patent Number: 5,223,210

[45] Date of Patent: Jun. 29, 1993

[54] PASSIVE COOLING SYSTEM FOR LIQUID METAL COOLED NUCLEAR REACTORS WITH BACKUP COOLANT FLOW PATH

[75] Inventors: Anstein Hunsbedt, Los Gatos; Charles E. Boardman, Saratoga, both of Calif.

[73] Assignee: General Electric Company, San Jose, Calif.

[21] Appl. No.: 745,808

[22] Filed: Aug. 16, 1991

[51] Int. Cl.$^5$ .............................................. G21C 15/12
[52] U.S. Cl. .................................. 376/290; 376/393; 376/299
[58] Field of Search ............... 376/290, 298, 293, 294, 376/295, 299

[56] References Cited

U.S. PATENT DOCUMENTS

| 4,508,677 | 4/1985 | Craig et al. | 376/174 |
| 4,678,626 | 7/1987 | Germer | 376/298 |
| 4,959,193 | 9/1990 | Hunsbedt et al. | 376/299 |
| 5,043,135 | 8/1991 | Hunsbedt et al. | 376/299 |
| 5,043,136 | 8/1991 | Hunsbedt et al. | 376/299 |

Primary Examiner—Donald P. Walsh
Assistant Examiner—Frederick H. Voss
Attorney, Agent, or Firm—Robert R. Schroeder

[57] ABSTRACT

A liquid metal cooled nuclear fission reactor plant having a passive auxiliary safety cooling system for removing residual heat resulting from fuel decay during reactor shutdown, or heat produced during a mishap. This reactor plant is enhanced by a backup or secondary passive safety cooling system which augments the primary passive auxiliary cooling system when in operation, and replaces the primary system when rendered inoperable.

10 Claims, 2 Drawing Sheets

PASSIVE COOLING SYSTEM FOR LIQUID METAL COOLED NUCLEAR REACTORS WITH BACKUP COOLANT FLOW PATH

The Government of the United States has rights in this invention under Contract No. DE-AC03-89SF17445. This application is related to U.S. Pat. No. 4,959,193, issued Sep. 25, 1990, and pending applications Ser. No. 07/353,423, filed May 18, 1989 and Ser. No. 07/541,647, filed Jun. 21, 1990.

FIELD OF THE INVENTION

This invention relates to an improvement in a passive cooling system for liquid metal cooled nuclear reactors having a pool of liquid metal coolant with the heat generating fissionable fuel core substantially immersed in the liquid metal pool, such as the type disclosed in U.S. Pat. No. 4,508,677, issued Apr. 2, 1985.

BACKGROUND OF THE INVENTION

In the operation of liquid sodium or sodium-potassium metal cooled nuclear reactors for power generation, it may be necessary to shut down the fission reaction of the fuel to deal with emergencies or carry out maintenance services. Reactor shut down is attained by inserting neutron absorbing control rods into the core of fissionable fuel to deprive the fuel of the needed fission producing neutrons. However decay of the fuel in the shut down reactor continues to produce heat in significant amounts which must be dissipated from the reactor units.

The heat capacity of the liquid metal coolant and adjacent structure aid in dissipating the residual heat. However, the structural materials of the nuclear reactor may not be capable of safely withstanding prolonged high temperatures. For example the concrete of the walls of the typical housing silo may splay and crack when subjected to high temperatures. Accordingly, auxiliary cooling systems are commonly utilized to safely remove heat from the nuclear reactor structure during shut down.

Conventional nuclear reactors have utilized a variety of elaborate energy driven cooling systems to dissipate heat from the reactor. In many of the situations warranting a shutdown, the energy supply to the cooling systems make the cooling systems themselves subject to failure. For example, pumps and ventilation systems to cool the core may fail. Furthermore, if operator intervention is necessary, there are foreseeable scenarios in which the operator would be unable to provide the appropriate action. The most reliable and desirable cooling system would be a completely passive system which could continuously remove the residual heat generated after shutdown.

Liquid metal cooled reactors such as the modular type disclosed in U.S. Pat. No. 4,508,677, utilizing sodium or sodium-potassium as the coolant provides numerous advantages. Water cooled reactors operate at or near the boiling point of water. Any significant rise in temperature results in the generation of steam and increased pressure. By contrast, sodium or sodium-potassium has an extremely high boiling point, in the range of 1800 degrees Fahrenheit at one atmosphere pressure. The normal operating temperature of the reactor is in the range of about 900 degrees Fahrenheit. Because of the high boiling point of the liquid metal, the pressure problems associated with water cooled reactors and the steam generated thereby are eliminated. The heat capacity of the liquid metal permits the sodium or sodium-potassium to be heated several hundred degrees Fahrenheit without danger of materials failure in the reactor.

The reactor vessels for pool-type liquid-metal cooled reactors are essentially open top cylindrical tanks without any perforations to interrupt the integrity of the vessel walls. Sealing of side and bottom walls is essential to prevent the leakage of liquid metal from the primary vessel. The vessel surfaces must also be accessible for the rigorous inspections required by safety considerations.

In the typical sodium cooled reactor, two levels of sodium loops are used. Usually, a single primary loop and two or more secondary loops are used. The primary loop contains very radioactive sodium which is heated by the fuel rods. The primary loop passes through heat exchangers to exchange the heat with one of the non-radioactive secondary sodium loops.

Upon shutdown of the reactor by fully inserting the control rods, residual heat continues to be produced and dissipated according to the heat capacity of the plant. Assuming that the reactor has been at full power for a long period of time, during the first hour following shutdown, an average of about 2% of full power continues to be generated. The residual heat produced continues to decay with time.

This invention comprises an improvement upon the passive cooling system for removing shutdown decay heat from a liquid metal cooled nuclear reactor disclosed and claimed in U.S. Pat. No. 4,678,626, issued Dec. 2, 1985.

The disclosed contents of the above noted U.S. Pat. Nos. 4,508,677 and 4,678,626, comprising related background art, are incorporated herein by reference.

SUMMARY OF THE INVENTION

This invention comprises an improved shut down, passive heat removal system for liquid metal cooled nuclear fission reactors which transfers reactor decay and sensible heat from the fuel core and liquid metal coolant by means of the inherent thermal energy transfer mechanisms of conduction, radiation, convention and natural convection of fluids out to the ambient atmosphere. The improved system of the invention is entirely passive and operates continuously through the inherent phenomenon of natural convection in fluids, conduction, convection, and thermal radiation.

The invention particularly includes a primary passive cooling circuit for the flow of cooling air located adjacent to the conventional combination of reactor and containment vessels to transfer thermal energy absorbed from the outer surfaces of the containment vessel to the atmosphere which is combined with a backup secondary passive cooling system for service in the event of significant breach of the reactor and containment vessels.

In the event of a reactor shutdown, after the control rods are fully inserted into the fuel core, the heat generated by the fuel rods is transferred through the reactor vessel across an inert gas gap to the surrounding containment vessel primarily by the thermal radiation, with a small fraction of the heat transferred by conduction and convection in the contained inert gas. Surfaces of high thermal emissivity provided on the outside of the reactor vessel and the interior of the containment vessel increase the efficiency of the heat transfer.

Heat is then removed from the outside surface of the containment vessel partly by thermal radiation and partly by direct convection to the circulating air in the passage between the containment vessel and the shield. The energy is then transported to the atmosphere by naturally circulating air.

Vessels for modular-type reactors have approximately one third the diameter and are about the same height as conventional nuclear reactor vessels. In modular reactors, the ratio of the surface area to the power generated is approximately three times greater than the surface area to power ratio in a conventional and large reactor. This provides sufficient surface area over which the residual heat may be passively dissipated. The highly emissive exterior surfaces of the containment vessel also enhance the heat transfer.

OBJECTS OF THE INVENTION

It is a primary object of this invention to provide an improvement in a passive cooling safety system for liquid metal cooled nuclear reactors for the removal of decay and sensible heat under conditions of accidental malfunctions.

It is also an object of this invention to provide measures for enhancing the protection afforded by indirect cooling safety means for the passive cooling of liquid metal cooled nuclear reactors comprising a core of fissionable fuel substantially submerged within a pool of liquid metal coolant.

It is another object of this invention to provide added protective measures for passive cooling safety systems in liquid metal cooled nuclear reactors comprising an auxiliary backup passive cooling circuit for removing heat upon the occurrence of liquid metal coolant leakage due to a significant break of reactor and containment vessels.

It is a further object of this invention to provide means for improving the operating safety of heat removing systems for liquid metal cooled nuclear reactors which are entirely passive and operate by the inherent phenomenon of natural convection in fluids, conduction, convection and thermal radiation.

It is a still further object of this invention to provide a backup passive safety system for removing decay and sensible heat produced during shut down or an accidental interruption in a liquid metal cooled nuclear reactor which affords effective protection against the destructive effects of escaping liquid metal coolant and its escape into the atmosphere.

DETAILED DESCRIPTION OF THE INVENTION

Pool-type liquid-metal cooled reactors have sufficient surface area to accommodate dissipation of residual heat during reactor shutdown events. Overall, the reactor system has a relatively small heat capacity. The problem remaining is to dissipate the residual heat without significantly damaging the containment structures. A completely passive cooling system eliminates reliance on energy driven pumps and fans and the need for operator intervention. At the same time, the containment vessel itself must not be structurally modified due to the size constraints on modular reactors, and the necessity of a smooth, unperforated tank structure to prevent any areas where stresses might accumulate. Strict inspection requirements also require that the containment vessel be simple to inspect both during manufacture and erection of the structure.

Figure 1:
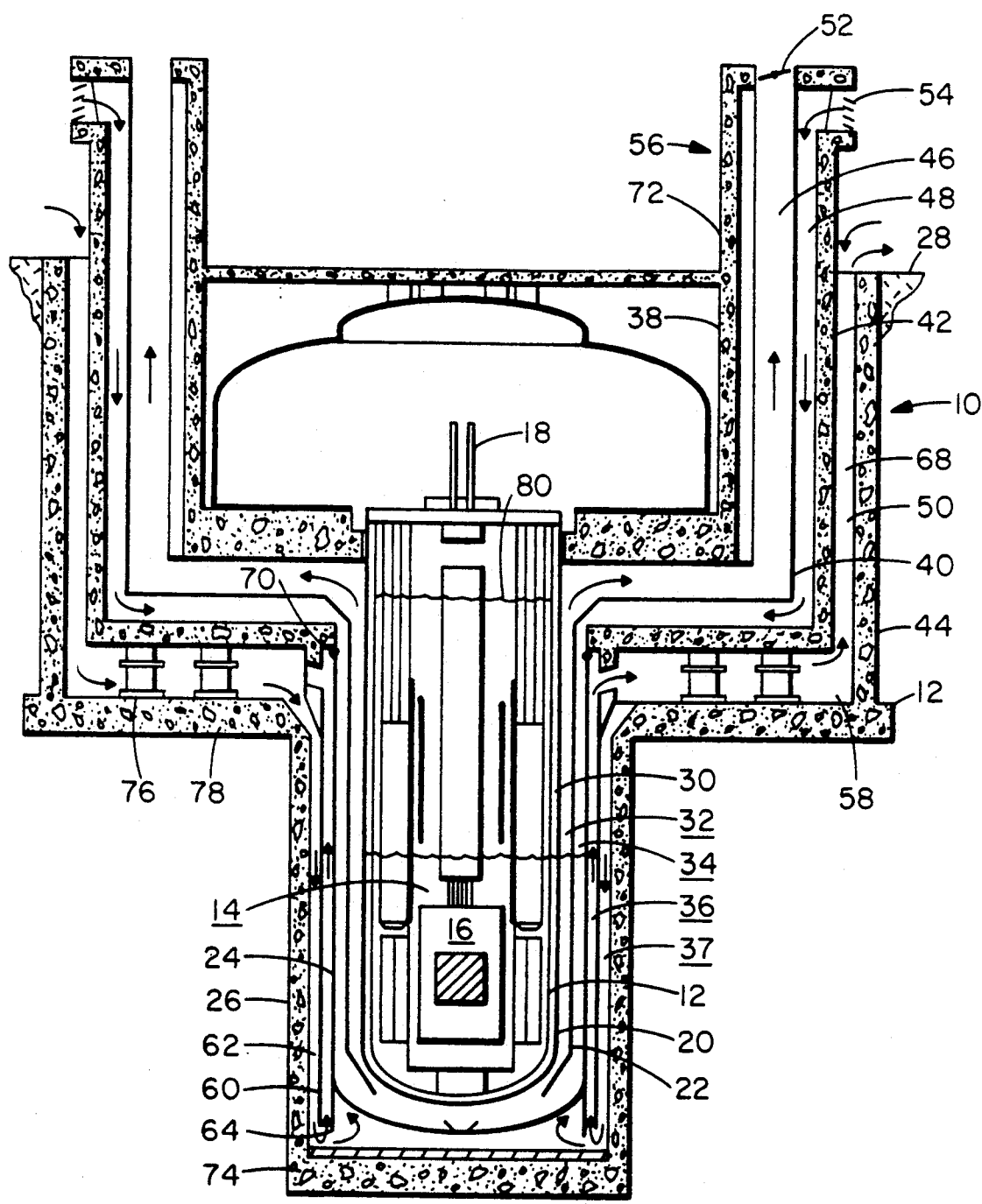
FIG. 1 is a schematic illustration of a liquid metal cooled nuclear reactor plant in cross-section.
Figure 2:
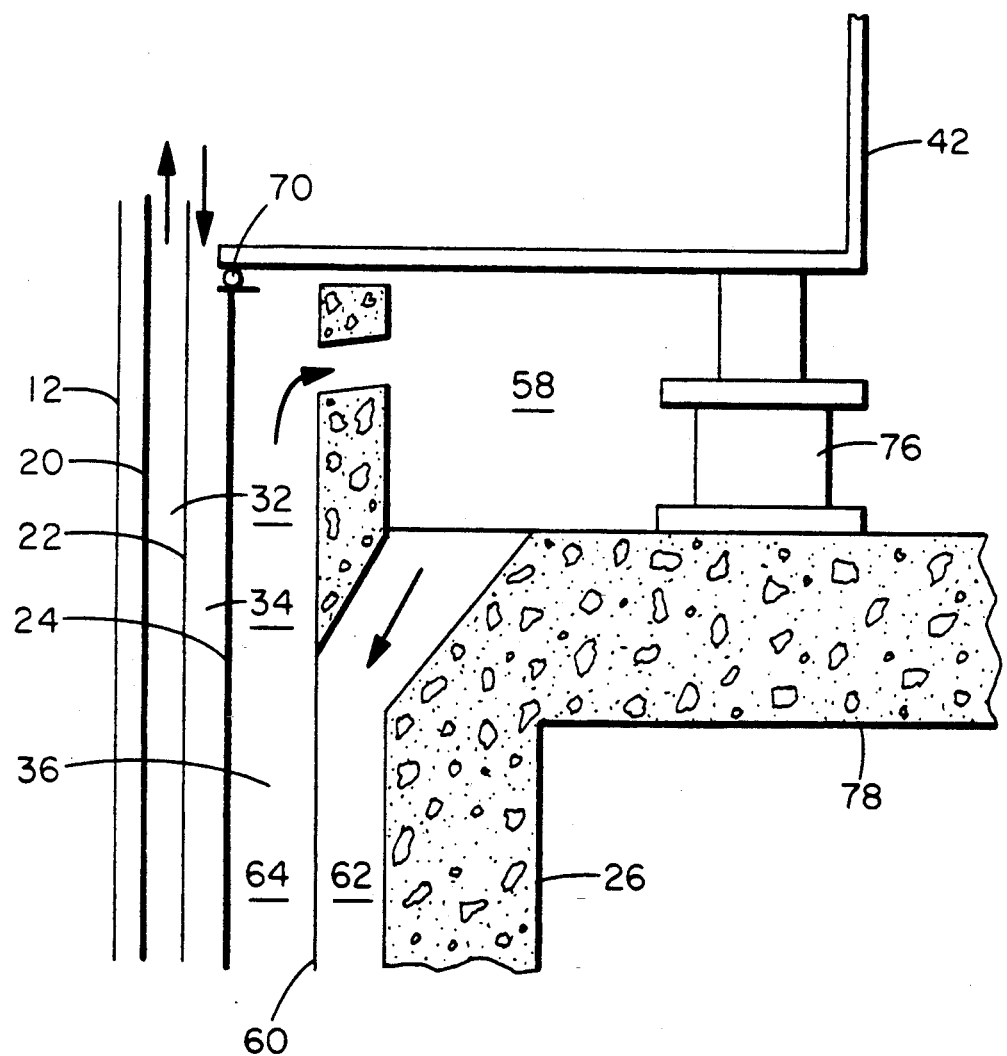
FIG. 2 is an expanded view illustrating in detail a portion of the composite structure of FIG. 1.

Referring to FIG. 1 of the drawings, an embodiment of a pool-type, liquid metal cooled nuclear reactor plant 10, comprises a reactor vessel 12, typically consisting of an cylindrical tank positioned with its longitudinal axis extending vertically upright, and having an open upper end provided with a removable cover. Reactor vessel 12 contains a pool of liquid metal coolant 14, such as sodium metal, with a heat producing core of fissionable fuel 16 substantially immersed within the liquid metal coolant pool 14 for heat transfer. Fission action of the fuel and the rate thereof is governed by neutron absorbing control rods 18 moving out from or into the fuel core 16.

The reactor vessel 12 is enclosed within a concentrically surrounding containment vessel 20 in space apart relation. A baffle cylinder 22 encircles substantially the length of the containment vessel 20 in spaced apart relation. A guard vessel 24 concentrically surrounds the baffle cylinder 22 with the containment vessel 20 and reactor vessel 12, in spaced apart relation. A concrete silo 26 houses the concentrically combined and spaced apart arrangement of the guard vessel 24, the baffle cylinder 22, the containment vessel 20 and the reactor vessel 12.

Preferably the concrete silo 26 is substantially buried into the ground to the extent that its contained reactor vessel 12 and adjoining vessels and cylinder are located at least below the ground surface, shown in the drawings as 28. Locating the liquid metal containing reactor vessel below ground surface precludes the escape of any liquid metal regardless of any loss of integrity of the plant.

A containment dome covers the open top of the concrete silo to prevent any escape of radioactive contamination from the reactor plant out into the atmosphere.

This arrangement of these combined components in surrounding or encircling and spaced apart positions, provides for their respective side walls forming a series of partitions with intermediate spaces. Specifically, a space 30 between the partitions comprising the side walls of the reactor vessel 12 and containment vessel 20; a space 32 between the partitions comprising side walls of the containment vessel 20 and the baffle cylinder 22; a space 34 between the partitions comprising the side walls of the baffle cylinder 22 and the guard vessel 24; and a space 36 between the partitions compressing the inside wall of the guard vessel 24 and the concrete silo 26, which in turn is divided by a second baffle cylinder.

In a preferred embodiment of the invention wherein the above combined components are circular in cross-section and concentrically surround or encircle one another, the intermediate space 30, 32, 34, 36 and 37 are each substantially annular in cross-section.

The containment vessel 20, the baffle cylinder 22, guard vessel 24 and concrete silo 26 are each provided with at least one upward projection or continuing wall extending above the uppermost portions of the reactor vessel 12, and up beyond the ground level 28. Thus the annular spaces 32, 34, and 36 formed intermediate the partitions are continued or in fluid communication with a corresponding space between projections or continuing walls extending above the heat producing reactor and its enclosing vessel 12. Specifically projection or continuing wall 38 extends from or adjoins the containment vessel 20, the projection or continuing wall 40 extends from or adjoins the baffle cylinder 22, the projection or continuing wall 42 extends from or adjoins the guard vessel 24, and projection or continuing wall 44 extends from or adjoins the concrete silo 26.

These projections or continuing walls extending from or adjoining these vessels and cylinder which define the spaces 32, 34, and 36, with space 36 being divided into subspaces 62 and 64 by baffle cylinder 60 provide corresponding continuations or ducts extending upward from each of said spaces. The projections or extension wall 38 continuing from or adjoining the containment vessel 20 and the projections or extension wall 40 continuing from or adjoining the baffle cylinder 22 form a channel or at least one duct 46 in fluid communication with space 32 and extends therefrom upward opening out into the ambient atmosphere. The projections or extension wall 40 continuing from or adjoining the baffle cylinder 22 and the projections or extension wall 42 continuing from or adjoining the guard vessel 24 form a channel or at least one duct 48 in fluid communication with space 34 and extends therefrom upward opening out into the ambient atmosphere. The projections or extension wall 42 continuing from or adjoining the guard vessel 24 and the projections or extension wall 44 continuing from or adjoining the concrete silo 26 form a channel or at least one duct 50 in fluid communication with space 36 and extends therefrom upward opening out into the ambient atmosphere.

The space 30 intermediate the reactor vessel 12 and containment 20 is typically filled with an inert gas, such as argon or nitrogen, and sealed. The containment vessel 20 and intermediate inert gas serves as a protective measure against the occasion of a breach of the reactor vessel 12 and in turn leaking of liquid metal coolant such as sodium.

The channel or duct(s) 46 and channel or duct(s) 48, are provided with isolation valves 52 and 54, respectively, for closing off the spaces 32 and 34 along with their adjoining channels or ducts from the atmosphere.

In operation, heat produced by the fuel core 16 is conveyed to the reactor vessel 12 by natural convection of the surrounding liquid metal coolant 14, then transferred mainly by thermal radiation across the inert gas containing space 30 from the reactor vessel 12 to the containment vessel 20. The heat is absorbed by the air in space 32 which is in contact with the outer surface of the containment vessel 20 and is carried along in the air rising upward due to its decreased density from heating thereby inducing a natural draft in space 32. The heat induced air flow continues upward from space 32 through channel or duct(s) 46 and out into the atmosphere where the heat is vented. This heat induced air flow up and out through space 32 and duct 48 draws air in from the atmosphere down into channel or duct(s) 48 and through space 34. From space 34 the cool atmospheric air flow continues passing beneath the lower edge of the baffle cylinder 22 and up into space 32 where it is heated from the hot outer surface of the containment vessel 20 to perpetuate the circulating cooling flow through the auxiliary safety cooling system for venting the carried heat out into the atmosphere. This heat motivated cooling course of through channels or ducts and/or spaces 48, 34, 32 and 46 comprises auxiliary safety cooling circuit or loop 56.

Continued emissions of heat from the fuel core and transfer to the air within space 32 perpetuates the cooling air flow through the auxiliary safety cooling circuit or loop 56, and dissipation of heat out into the ambient atmosphere.

Thermal performance studies of the system indicate that the maximum average core sodium outlet temperature for a decay heat removal transient is about 1140 degrees F. which is well below the current ASME service level temperature limit of 1200 degrees F. based on nominal calculations.

An extreme and improbable postulated event proposed for safety considerations is the unlikely rupturing of both the reactor and the containment vessels 12 and 20. Such an event would permit the leakage of the liquid metal coolant, typically sodium, contents from the reactor vessel 12 and through the containment vessel 20 out into spaces 32 and 34, possibly blocking the cooling air flow therethrough, as well as imperiously reducing the level of coolant remaining in the reactor vessel for conveying heat away from the fuel core 16. Hot liquid metal coolant such as the commonly used sodium escaping out from the confines of the reactor and containment vessels could result in exothermic chemical reactions, sodium fires and/or a severe release of radioactive material out into the ambient atmosphere. Such an event and coolant leakage which obstructs the cooling air circulation through spaces 32 and 34 prevents the operation of the passive cooling safety system for the removal of decay and sensible heat whereby resultant overheating can cause significant damage to structural components of the reactor plant which propagates further destruction and hazards.

In accordance with the invention, a backup or secondary auxiliary safety cooling course or system 58 is provided to coupe with significant liquid metal coolant leaks due to a breach of both the reactor and containment vessel 12 and 20.

Referring to the drawing, a baffle cylinder 60 is provided extending down between the concrete silo 26 and the guard cylinder 24 substantially surrounding the length of the guard cylinder. The baffle cylinder 60, which does not extend down to the floor of the concrete silo, divides space 36 into two annular subspaces, subspace 62 between the concrete silo 26 and baffle cylinder 60, and subspace 64 between the baffle cylinder 60 and the guard vessel 26. Subspaces 62 and 64 are in fluid communication below the lower end of baffle cylinder 60.

The backup safety cooling course 58 comprises at least one upward projecting or continuing wall 44 continuing outward and upward above the ground level 28 extending from or adjacent to the concrete silo 26. Wall 44 and wall 42 form an annular area which can be divided into sections by radial-like partitions extending from one wall to the other to provide several ducts or flues leading from the atmosphere down into the space 36 between the concrete silo 28 and the guard vessel 24. At least one section forming duct(s) 66 makes fluid communication with subspace 62 between the concrete silo 28 and baffle cylinder 60, and at least one section forming duct(s) 68 makes fluid communication with subspace 64 between the baffle cylinder 60 and the guard vessel 24. Thus both subspaces 62 and 64 are in communication with the outer atmosphere and are in fluid communication with each other in the area beneath the lower end of the baffle cylinder 60.

A seal 70 can be provided between the upper portion of the guard vessel 24 and wall 42.

Accordingly, in the event of a double breach of the reactor and containment vessels 12 and 20 resulting in substantial leakage of liquid metal coolant into spaces 32 and 34, the valves 52 and 54 in ducts 46 and 48 are closed to prevent radioactive containments escaping out into the atmosphere. Moreover, the heat of the leaked liquid metal into spaces 32 and 34 carries to space 36 and thus induces air in subspace 64 to rise upward carrying heat entrained therein and out into the atmosphere through duct(s) 68 venting the heat. This heat induced air flow from subspace 64 draws air in from the atmosphere down through duct(s) 66 into subspace 62 and then under baffle cylinder 60 and reversing direction into subspace 60 whereby a circulating cooling air flow through the backup safety cooling course 58 is perpetuated and continues as long as heat is generated and transferred to space 36 or subspace 64.

Thus, this backup safety cooling course or system 58 is separate from the primary auxiliary safety cooling course 56, and the cooling air subspaces 62 and 64 and ducts 68 and 66 are not closed off when the isolation valves 52 and 54 are closed. Moreover there is no direct contact between the cooling air and the liquid metal coolant typically comprising sodium. Reactor heat is removed by this backup course 58 at all times, including normal reactor operating and auxiliary safety cooling 56 decay heat removal operating conditions. However, heat removal by the backup course 58 increases significantly when the guard vessel 24 is partially filled with hot liquid metal coolant following a postulated double vessel 12 and 20 leak event and the normal operating liquid metal coolant level 80 of the reactor vessel 12 has dropped to the double vessel leak level 82 within the reactor vessel 12. Analysis demonstrate that heat removal by this backup system will maintain maximum bulk liquid metal coolant temperatures below a design limit for precluding destructive and/or hazardous results.

An embodiment of this invention comprises a design to cope with the effects of earthquakes. This design comprises a composite of the reactor vessel 12 and its enclosing containment vessel 20 being suspended from an overlying superstructure 72 which includes other seismic sensitive plant components. The vessel carrying superstructure 72 is mounted on and supported with seismically isolating means resting on a fixed structure foundation 74 comprising an upper structural portion of the earth embedded concrete silo 26. Thus the superstructure 72 carrying the reactor and containment vessels 12 and 20 can be mounted and supported on shock absorbers 76, such as springs, rubber pads, hydraulic absorbers and the like which are fixed to an upper annular surface or flange 78 extending around the earth embedded silo 26 comprising the fixed structure 74.

What is claimed is:

1. A dual passive cooling system for liquid metal cooled nuclear fission reactors, comprising the combination of:
   a reactor vessel for containing a pool of liquid metal coolant with a core of heat generating fissionable fuel substantially submerged therein, a side wall of the reactor vessel forming an innermost first partition;
   a containment vessel substantially surrounding the reactor vessel in spaced apart relation having a side wall forming a second partition;
   a first baffle cylinder substantially encircling the containment vessel in spaced apart relation having an encircling wall forming a third partition;
   a guard vessel substantially surrounding the containment vessel and first baffle cylinder in spaced apart relation having a side wall forming a forth partition;
   a sliding seal at the top of the guard vessel edge to isolate the dual cooling system air streams;
   a second baffle cylinder substantially encircling the guard vessel in spaced part relationship having an encircling wall forming a fifth partition;
   a concrete silo substantially surrounding the guard vessel and the second baffle cylinder in spaced apart relation providing a sixth partition;
   a first fluid coolant circulating flow course open to the ambient atmosphere for circulating air coolant comprising at least one downcomer duct having an opening to the atmosphere in an upper area thereof and making fluid communication with the space between the guard vessel and the first baffle cylinder and at least one riser duct having an opening to the atmosphere in the upper area thereof and making fluid communication with the space between the first baffle cylinder and the containment vessel whereby cooling fluid air can flow from the atmosphere down through the downcomer duct and space between the forth and third partitions and up through the space between the third and second partition and the riser duct then out into the atmosphere; and
   a second fluid coolant circulating flow course open to the ambient atmosphere for circulating air coolant comprising at least one downcomer duct having an opening to the atmosphere in an upper area thereof and making fluid communication with the space between the concrete silo and the second baffle cylinder and at least one riser duct having an opening to the atmosphere in the upper area thereof and making fluid communication with the space between the second baffle cylinder and the guard vessel whereby cooling fluid air can flow from the atmosphere down through the downcomer duct and space between the sixth partition and the fifth partition and up through the space between the fifth partition and the forth partition and up the riser duct and out into the atmosphere.

2. The dual passive cooling system for liquid metal cooled nuclear reactors of claim 1, wherein the reactor vessel containing the fuel core submerged within liquid metal coolant is located substantially buried below ground level.

3. The dual passive cooling system for liquid metal cooled nuclear reactors of claim 1, wherein the reactor vessel, the containment vessel, the first baffle cylinder, the guard vessel, and the second baffle cylinder are each circular in cross-section, of respectively increasing diameter and concentrically arranged with their side walls providing spaced apart partitions forming annular intermediate areas therebetween.

4. The dual passive cooling system for liquid metal cooled nuclear reactors of claim 1, wherein closing valves are provided in the downcomer duct and the riser duct of the first fluid coolant circulating flow course.

5. A dual passive cooling system for liquid metal cooled nuclear fission reactors, comprising the combination of:

a reactor vessel for containing a pool of liquid metal coolant with a core of heat generating fissionable fuel substantially submerged therein, a side wall of the reactor vessel forming an innermost first partition;

a containment vessel substantially surrounding the reactor vessel in spaced apart relation having a side wall forming a second partition;

a first baffle cylinder substantially surrounding the length of the containment vessel in spaced apart relation having an encircling wall forming a third partition;

a guard vessel substantially surrounding the containment vessel and first baffle cylinder in spaced apart relation having a side wall forming a forth partition;

a sliding seal at the top of the guard vessel to isolate the area within the guard vessel;

a second baffle cylinder substantially surrounding the length of the guard vessel in spaced part relationship having an encircling wall forming a fifth partition;

a concrete silo substantially surrounding the guard vessel and the second baffle cylinder in spaced apart relation providing a sixth partition;

a first fluid coolant circulating flow course open to the ambient atmosphere for circulating air coolant comprising at least one downcomer duct having an opening to the atmosphere in an upper area thereof and making fluid communication with the space between the guard vessel and the first baffle cylinder and at least one riser duct having an opening to the atmosphere in the upper area thereof with a closing valve and making fluid communication with the space between the first baffle cylinder and the containment vessel whereby cooling fluid air can flow from the atmosphere down through the downcomer duct and space between the forth and third partitions and up through the space between the third and second partition and the riser duct then out into the atmosphere; and a second fluid coolant circulating flow course open to the ambient atmosphere for circulating air coolant comprising at least one downcomer duct having an opening to the atmosphere in an upper area thereof and making fluid communication with the space between the concrete silo and the second baffle cylinder and at least one riser duct having an opening to the atmosphere in the upper area thereof and making fluid communication with space between the second baffle cylinder and the guard vessel whereby cooling fluid air can flow from the atmosphere down through the downcomer duct and space between the sixth partition and the fifth partition and up through the space between the fifth partition and up the riser duct and out into the atmosphere.

6. The dual passive cooling system for liquid metal cooled nuclear reactor of claim 5, wherein the reactor vessel containing the fuel core substantially submerged within the liquid metal coolant is located substantially buried below ground level.

7. The dual passive cooling system for liquid metal cooled nuclear reactor of claim 5, wherein the reactor vessel, the containment vessel, the first baffle cylinder, the guard vessel, and the second baffle cylinder are each circular in cross-section, of respectively increasing diameter and concentrically arranged with their side walls providing spaced apart partitions forming annular intermediate areas therebetween.

8. The dual passive cooling system for liquid metal cooled nuclear reactor of claim 5, wherein a superstructure bridges across and is supported by the concrete silo with the reactor vessel and the containment vessel being suspended from the superstructure.

9. The dual passive cooling system for liquid metal cooled nuclear reactor of claim 8, wherein the superstructure is separated from and supported upon the concrete silo by means of seismic shockabsorbers.

10. A dual passive cooling system for liquid metal cooled nuclear fission reactors, comprising the combination of:

a reactor vessel for containing a pool of liquid metal coolant with a core of heat generating fissionable fuel substantially submerged therein, a side wall of the reactor vessel forming an innermost first partition;

a containment vessel substantially surrounding the reactor vessel in spaced apart relation having a side wall forming a second partition;

a first baffle cylinder substantially surrounding the length of the containment vessel in spaced apart relation having an encircling wall forming a third partition;

a guard vessel substantially surrounding the containment vessel and first baffle cylinder in spaced apart relation having a side wall forming a forth partition;

a second baffle cylinder substantially surrounding the length of the guard vessel in spaced part relationship having an encircling wall forming a fifth partition;

said reactor vessel, containment vessel, first baffle cylinder, guard vessel and second baffle cylinder each being substantially circular in cross-section and of respectively increasing diameter and concentrically arranged with their side walls providing spaced apart partitions forming annular intermediate area therebetween;

a concrete silo substantially buried below ground level and substantially surrounding the guard vessel and the second baffle cylinder in spaced apart relation providing a sixth partition;

a superstructure bridging across and supported by the concrete silo with said reactor vessel and containment vessel being suspended from the superstructure;

a first fluid coolant circulating flow course open to the ambient atmosphere for circulating air coolant comprising at least one downcomer duct having an opening to the atmosphere in an upper area thereof with a closing valve and making fluid communication with the space between the guard vessel and the first baffle cylinder, and at least one riser duct having an opening to the atmosphere in the upper area with a closing valve and making fluid communication with the space between the first baffle cylinder and containment vessel whereby cooling fluid air can flow from the atmosphere down through the downcomer duct and space between the forth and third partitions and up through the space between the third and second partition and the riser duct then out into the atmosphere; and a second fluid coolant circulating flow course open to the ambient atmosphere for circulating air coolant comprising at least one downcomer duct having an opening to the atmosphere in an upper area thereof and making fluid communication with the space between the concrete silo and the second baffle cylinder and at least one riser duct having an opening to the atmosphere in the upper area thereof and making fluid communication with the space between the second baffle cylinder and the guard vessel whereby cooling fluid air can flow from the atmosphere down through the downcomer duct and space between the sixth partition and the fifth partition and up between the fifth partition and the forth partition and up the riser duct and out into the atmosphere.

* * * * *